United States Patent
Fukuda et al.

(10) Patent No.: US 6,715,684 B1
(45) Date of Patent: Apr. 6, 2004

(54) CODE READING APPARATUS

(75) Inventors: Hiroyuki Fukuda, Hachioji (JP); Akira Matsui, Hachioji (JP); Mutsumi Kikuchi, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 684 days.

(21) Appl. No.: 09/655,379

(22) Filed: Sep. 5, 2000

(30) Foreign Application Priority Data

Sep. 6, 1999 (JP) .......................................... 11-251512
Oct. 28, 1999 (JP) .......................................... 11-307078

(51) Int. Cl.$^7$ ................................................. G06K 7/10
(52) U.S. Cl. .............. 235/462.27; 235/494; 235/462.45
(58) Field of Search ....................... 235/462.01, 462.07, 235/462.12, 462.25, 462.27, 462.45, 462.49, 470, 472.01, 472.03, 494, 454

(56) References Cited

U.S. PATENT DOCUMENTS

| 5,719,886 | A |   | 2/1998  | Matsui et al. |         |
|-----------|----|---|---------|---------------|---------|
| 5,724,364 | A | * | 3/1998  | Mori et al.   | 371/6   |
| 5,866,895 | A |   | 2/1999  | Fukuda et al. |         |
| 5,896,403 | A |   | 4/1999  | Nagasaki et al. |       |
| 5,898,709 | A |   | 4/1999  | Imade et al.  |         |
| 6,170,750 | B1| * | 1/2001  | Ueno          | 235/462.01 |
| 6,186,405 | B1| * | 2/2001  | Yoshioka      | 234/494 |
| 6,297,890 | B1| * | 10/2001 | Fukuda et al. | 235/494 |
| 6,364,209 | B1| * | 4/2002  | Tatsuta et al.| 235/494 |

* cited by examiner

Primary Examiner—Daniel St. Cyr
(74) Attorney, Agent, or Firm—Frishauf, Holtz, Goodman & Chick, P.C.

(57) ABSTRACT

A reconstituting section obtains block-address information from each of read out blocks. According to the obtained pattern in the block-address information obtained by the reconstituting section, a reproducing section determines a code-scanning state of manual scanning performed along a scanning direction. When scanning is performed in an off-code state and an overspeed state, and when scanning is terminated in an incomplete state, notification is performed in each of modes differing from each other depending on the scanning state.

12 Claims, 11 Drawing Sheets

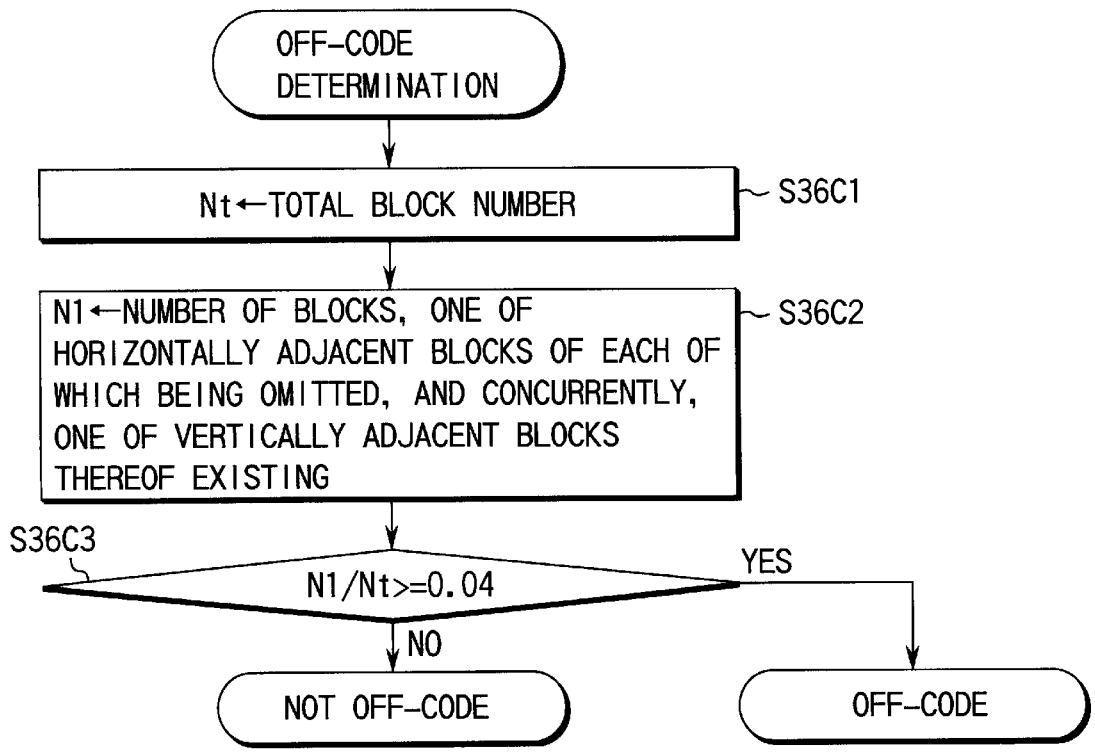

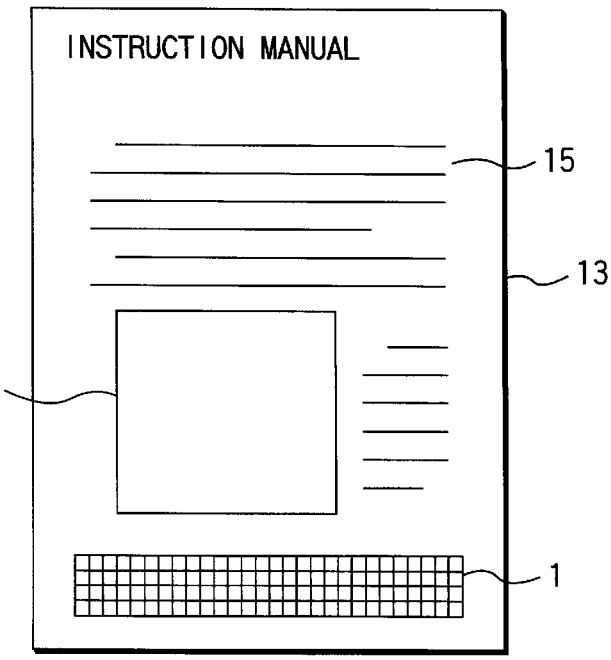
FIG. 20
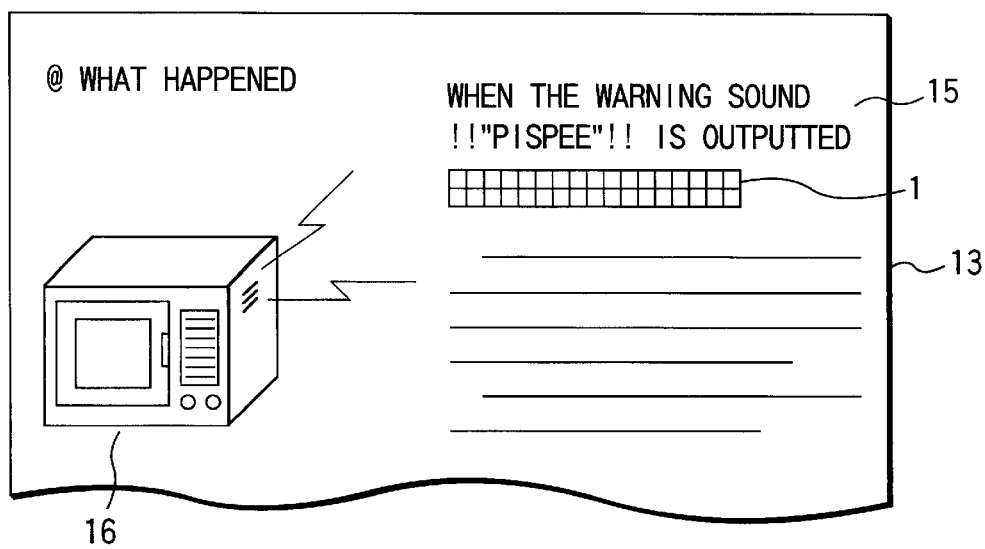
FIG. 21
| 2 | 4 | 6 | 8 | 10 | 12 | 14 | 16 | 18 | 20 | 22 | 24 | ~1-2 |
| 1 | 3 | 5 | 7 | 9 | 11 | 13 | 16 | 18 | 20 | 22 | 24 | |
FIG. 23

4 WHEN REPRODUCTION IS NOT SUCCESSFUL

WHEN NO SOUND IS REPRODUCED AND THE WARNING SOUNDS AS INDICATED BELOW ARE OUTPUTTED, OR WHEN DISCONTINUING SOUNDS ARE OUTPUTTED, PAY ATTENTION AS GUIDED BELOW AND TRY AGAIN.

(1) A WARNING SOUND AS 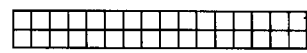
!!"POM"!! IS OUTPUTTED.
→ AFTER COMPLETION OF TRACING OF THE CODE, THE OPERATION SWITCH HAS BEEN TOUCHED FOR 10 SECONDS OR MORE. KEEP THE OPERATION SWITCH TO BE UNTOUCHED, THEN OPERATE THE APPARATUS AGAIN.
→ THE CODE IS NOT PROPERLY TRACED. TRY TO TRACE THE CODE SO AS NOT TO BE IN THE FOLLOWING IMPROPER EXAMPLE CONDITIONS.

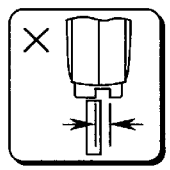 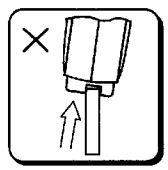 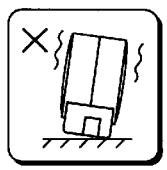 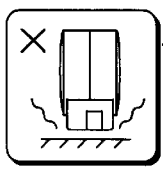
DEVIATING   SKEWING   CAREENING   FLOATING (2) A WARNING SOUND AS 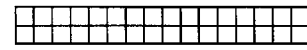
!!"POM HYOOM"!! IS OUTPUTTED.
→ THE CODE GUIDE IS OFF THE CODE. PROPERLY TRACE THE CODE SO THAT THE CODE GUIDE IS NOT OFF THE CODE. REGARDING HOW TO TRACE A CODE OR CODES, SEE SECTION 2, "REPRODUCE SOUNDS".

(3) A WARNING SOUND AS 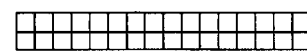
!!"POM HYUI"!! IS OUTPUTTED.
→ CODE-TRACING IS TOO FAST. TRACE THE CODE SLOWLY.

(4) A WARNING SOUND AS 
!!"POM POWAT"!! IS OUTPUTTED.
→ THE CODE IS NOT COMPLETELY TRACED. PROPERLY TRACE THE CODE FROM THE END TO THE END. PARTICULARLY, FOR A GROUPED CODE, KEEPING THE OPERATION SWITCH TO BE TOUCHED, PROPERLY TRACE ALL THE DIVISIONAL CODES. REGARDING HOW TO TRACE A CODE OR CODES, SEE 2, "REPRODUCE SOUNDS", AND ALSO SEE 3, "HOW TO TRACE CODE OR CODES".

FIG. 22

CODE READING APPARATUS

CROSS-REFERENCE TO RELATED APPLICATION

This application is based upon and claims the benefit of priority from the prior Japanese Patent Applications No. 11-251512, filed on Sep. 6, 1999; and No. 11-307078, filed on Oct. 28, 1999, the entire contents of which are incorporated herein by reference.

BACKGROUND OF THE INVENTION

The present invention relates to a code-reading apparatus configured to be used for manual scanning of recording media, such as paper sheets, on which data including audio data, image data, and text data is recorded as codes that can be optically read by manual scanning, thereby allowing the codes to optically read and to reproduce the data.

U.S. Pat. No. 5,896,403 proposes a technique that allows various types of data including audio data, image data, and text data to be printed and recorded on recording media, such as paper sheets, as optically readable codes that can be manually scanned and read.

FIG. 1 shows a physical format of an optically readable dot code disclosed in the above-referenced U.S. Pat. No. 5,896,403. A dot code 1 is basically composed of multiple rectangular bocks 2 that are two-dimensionally arranged to be adjacent to each other.

Each of the blocks 2 is composed of a data-dot pattern section 3, markers 4, and a block-address pattern section 5. The data-dot pattern section 3 contains data items that are sectional according to the individual blocks of various types of data, such as audio data, in a predetermined arrangement of dot images of white dots and black dots that correspond to "0" and "1" that represent values of the aforementioned sectional data. Each of the markers 4 is composed of a predetermined number of consecutive black dots and are arranged at each of four corners of the individual bocks 2. The markers 4 thus arranged are used as reference points that allow detection of the individual dots (data dots) in the data-dot pattern section 3. The block-address pattern section 5 comprises error-detecting symbols and error-correcting symbols. The block-address pattern section 5 is arranged between the markers 4 to allow identification in reading of the multiple bocks 2, each of which is unique in the contents.

In FIG. 1, the vertical and horizontal lines in the block 2 are virtual lines drawn for convenience of indicating positions of the individual dots. Also, in FIG. 1, the black dots are recorded, while the white dots are not recorded; and portions of the white dots are shown in the ground color of the recording medium.

FIG. 2 shows an electric-function block configuration of a reading apparatus for use of manual scanning and optical reading of the dot code 1.

The reading apparatus is configured of at least an image pickup section 6, a binarizing section 7, a binarized image memory 8, a reconstituting section 9, a demodulating section 10, and a reproducing section 11. The image pickup section 6 comprises an illuminating section making of a light-emitting device (LED) or the like and being provided for illuminating the dot code 1, an optical system for imaging light reflecting from the dot code 1 and an area sensor, such as a charge-coupled device (CCD), for picking up the imaging light that is provided from the optical system. The binarizing section 7 uses a predetermined binarizing threshold and thereby binarizes an image signal outputted from the image pickup section 6. The binarized image memory 8 stores binarized image data which is binarized by the binarizing section 7. The reconstituting section 9 reads the binarized image data stored in the binarized image memory 8, thereby detects the dots, assigns one of the values "0" and "1" to each of the detected dots, and outputs data thereof. The demodulating section 10 demodulates the data outputted from the reconstituting section 9. The reproducing section 11 performs processing such as error processing and expansion processing, thereby reproducing the original data, such as the audio data, and outputting the reproduced data.

As shown in FIG. 1, the overall size of the dot code 1 is larger than a view field 6A of the image pickup section 6. However, the image pickup section 6 moves in the scanning direction as indicated by an arrow shown in the figure, and serially picks up section by section for the dot code 1, thereby allowing the whole dot code 1 to be read out.

In other words, although the whole dot code 1 cannot be picked up in one shot (one frame), when data dot patterns and block address patterns thereof can be read in units of the blocks, data of the individual blocks can be collected according to the block addresses, and the original data can thereby be reconstituted. In this way, code-reading can be implemented by manual scanning.

The reconstituting section 9 reads binarized image data stored in the binarized image memory 8 and thereby detects each of the aforementioned dots. The reconstituting section 9 first locates the marker 4, then references the centroid position of the marker 4 that has been located, and thereby obtains a dot-reading reference position. Subsequently, from the dot-reading reference position, the reconstituting section 9 detects a dot-reading point for reading each of the dots arranged in the data-dot pattern section 3, determines whether the detected dot-reading point is white or black, assigns one of the values "0" and "1" thereto, and outputs the corresponding data.

Such being the configuration, the dot code is printed and recorded with high-density print quality. Therefore, even if the print included some geometrical skews, read-out thereof would be able to be appropriately implemented.

For data such as audio data inputted as a recording object, modulation is preliminarily performed at printing and recording of the dot code 1. Thus, the demodulating section 10 performs processing that returns the modulated data to the state of original data, that is, to the premodulation state.

Specifically, the aforementioned modulation is preliminarily performed to facilitate the detection of the marker 4 in the reconstituting section 9. The modulation is performed so that the number of consecutive black dots in the data-dot pattern section 3, which differentiates the individual dots in the data-dot pattern section 3 from the marker 4, resultantly becomes smaller than the number of the consecutive black dots.

For example, suppose the maximum diameter of the marker 4 is equivalent to the size allowing five pieces of the black dots to be printed and recorded in the data-dot pattern section 3 are adjacently arranged in a predetermined direction. In this case, the modulation is performed for data such as audio data inputted as described above so that the number of consecutive black dots in modulated data (that is, after the modulation processing is performed) becomes smaller than five.

The individual configuration members are packaged in, for example, a pen-shape casing, thereby allowing manual operation to be performed for optical reading of the dot code 1 printed and recorded on a sheet-like recording medium, such as a paper sheet.

Specifically, as shown in FIG. 3, a reading opening provided is on an end portion of a reading apparatus 12, is positioned so as to be in contact with a recording medium 13, and is moved in a manner of tracing the dot code 1 printed and recorded on the recording medium 13 in the scanning direction, thereby outputting, for example, sounds.

As described above, according to the reading apparatus described above, easy manual operation allows optical reading to be implemented for the code recorded on the recording medium. Compared to a reading apparatus that requires a recording medium to be fitted in a predetermined position and that mechanically (i.e., automatically) operates to read a code recorded on the recording medium, handiness in handling of the above-described apparatus is further improved, and also, the usability thereof is significantly improved.

Thus, the reading apparatus is advantageous with regard to the manual scanning. At the same time, however, it cannot be denied that the manual scanning is unstable because of its nature. When scanning is performed in a condition that is worse than a predetermined condition, the same reading apparatus produces a disadvantage in that the original data cannot be reproduced, thus remaining the antinomy problems to be held pending solution.

A measure for solving the problems that can be considered is that the reading apparatus is configured to be capable of feeding back to a user regarding why a condition of read-out scanning actually performed is wrong. If causes for errors can be fed back to the user, it can be expected that the user would be careful to prevent recurrence of the errors in the future operation. It can be expected that this results in reduction of operational errors.

U.S. Pat. No. 5,719,886 discloses a technique of warning a user when scanning is performed in a state where a reading apparatus is off a code intended to be read out.

However, according to the technique disclosed in the aforementioned patent, although warnings are issued for errors that are caused by scanning performed in a state where the reading apparatus is erroneously off the code, the actual causes for the errors are not clear. This offers difficulty in knowing whether a warning was issued because scanning of a code intended to be read out was incompletely terminated or because scanning speed was so high that a block or blocks in the code were omitted in scanning.

Thus, since the user is given no way to know why the condition of actual read-out scanning is wrong, the user has no way to appropriately reflect the wrong condition in the future read-out scanning. From this viewpoint and for users to improve their skill of read-out scanning, the above-described measure cannot be evaluated to be sufficient to solve the above-described problems.

BRIEF SUMMARY OF THE INVENTION

The present invention is made under the above-described circumstances. Accordingly, an object of the invention is to provide a code-reading apparatus that allows advantages of a reading apparatus to be even more enjoyed, the reading apparatus being capable of determining states of code-read-out scanning and appropriately feeding the states back to a user as guidance information, thereby allowing manual scanning to be implemented.

According to an aspect of the present invention, there is provided a code-reading apparatus comprising:

reading means allowing manual scanning to optically read a code from a recording medium having data recorded as the code that is optically readable, the code comprising a plurality of blocks provided for defining a read unit of the code and arranged at least in a scanning direction, and each of the blocks comprising block-address information indicating an address of each of the blocks in the code;

block-address-information-obtaining means for obtaining the block-address information from each of the blocks read out by the reading means;

scanning-state-determining means for determining a scanning state of manual scanning performed for the code along the scanning direction according to an obtained pattern in obtaining the block-address information obtained by the block-address-information-obtaining means; and notifying means for performing predetermined notification according to a result of determination performed by the scanning-state-determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is an explanatory view of omitted blocks at off-code scanning;

FIG. 13 is a flowchart of off-code-determining processing in the first embodiment;

FIG. 14 is an explanatory view of omitted blocks on a partway of code-scanning;

FIGS. 20, 21, and 22 individually show example pages of an instruction manual of an electronic apparatus, the pages being used to explain an application example of the present invention; and FIG. 23 is a view used to explain a dot code as a code image that is printed and recorded in an instruction manual of another application example, the view showing an arrangement of block addresses that cause a state similar to that in FIG. 12 when the off-code scanning is caused.

DETAILED DESCRIPTION OF THE INVENTION

Hereinbelow, a description will be given of embodiments according to the present invention with reference to the drawings.

FIRST EMBODIMENT

Figure 1:
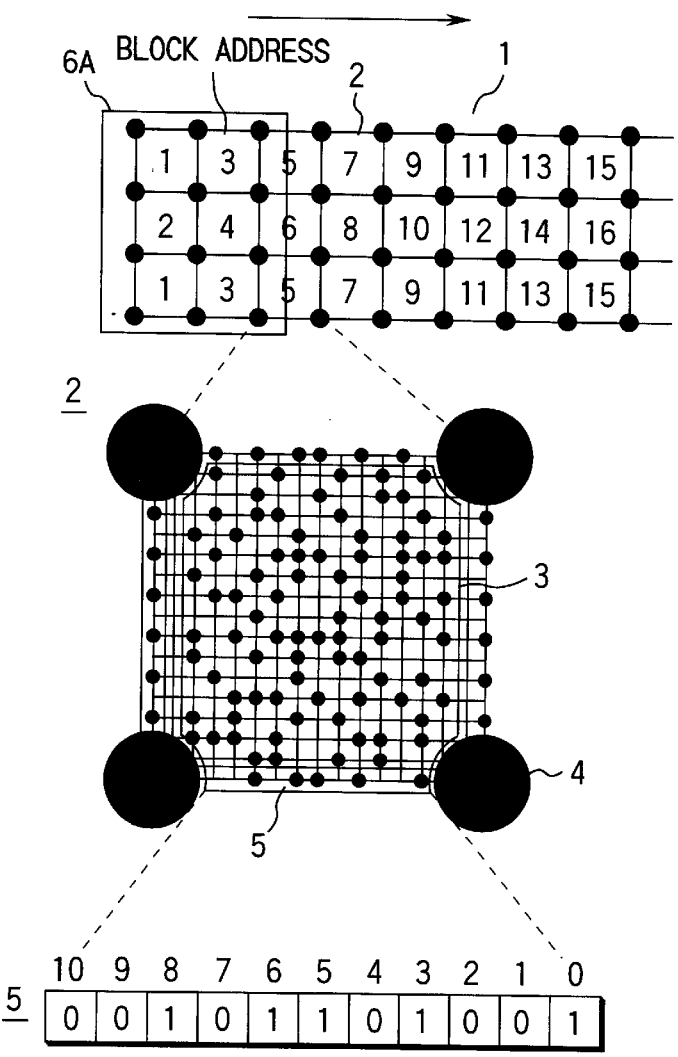
FIG. 1 is a view showing a physical format of a dot code which is an optically readable code.
Figure 2:
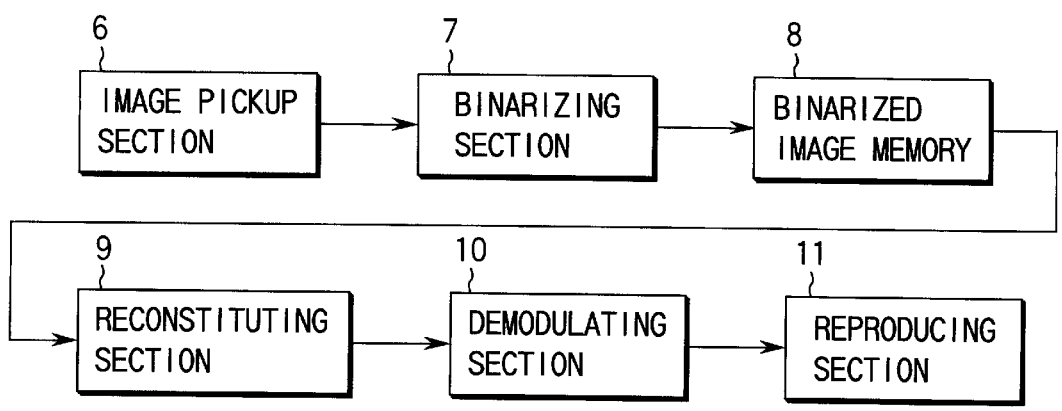
FIG. 2 is a block configuration view of a conventional code-reading apparatus.
Figure 3:
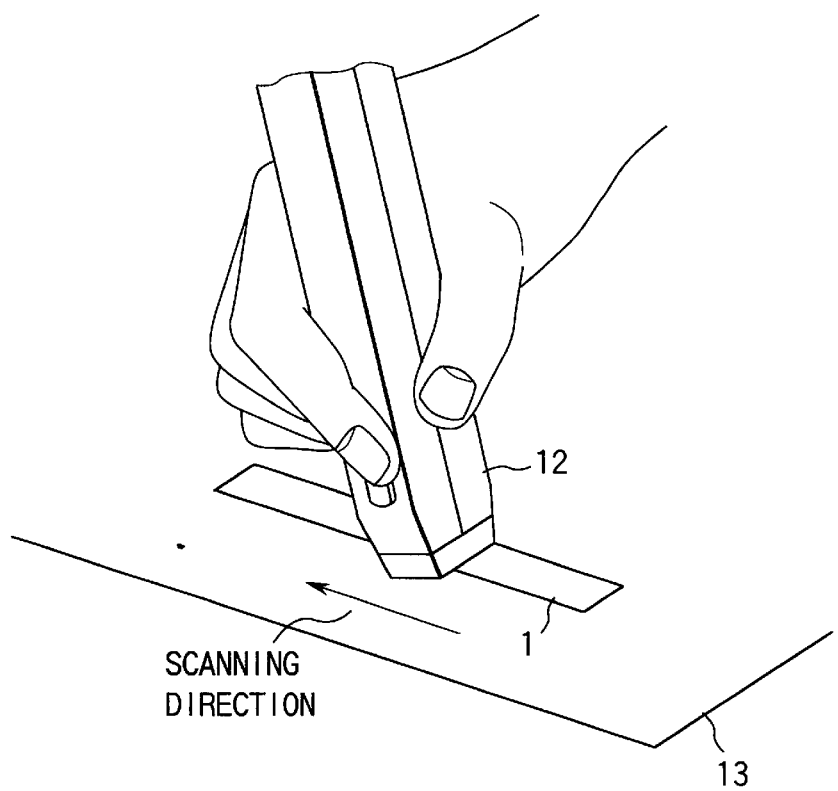
FIG. 3 is a view showing a state of scanning performed by the code-reading apparatus shown in FIG. 2.
Figure 4:
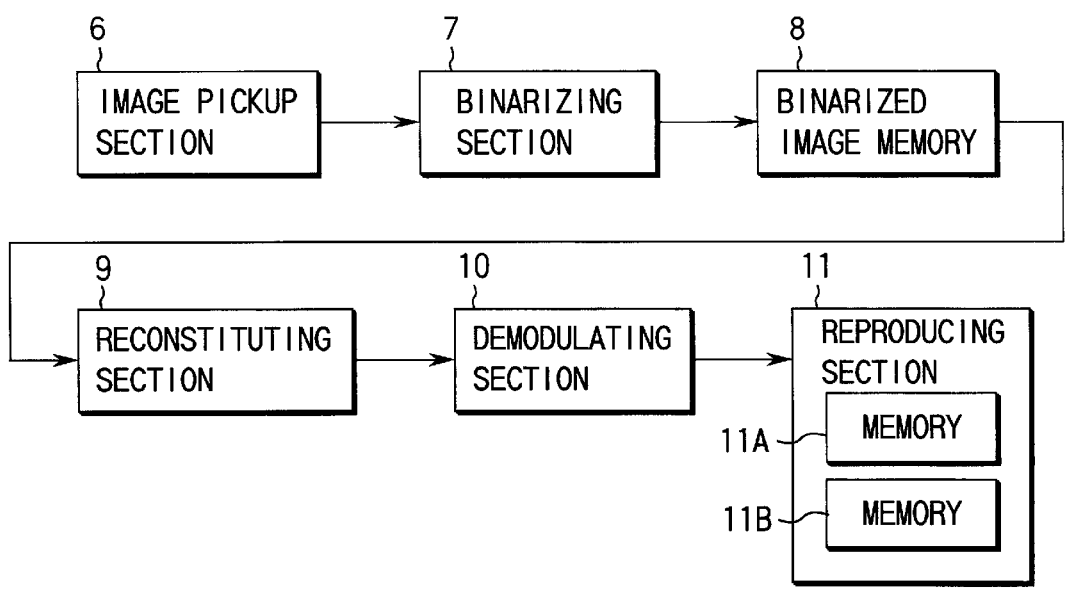
FIG. 4 is a block diagram showing a configuration of a code-reading apparatus according to a first embodiment of the present invention.

FIG. 4 shows a configuration of a code-reading apparatus according to a first embodiment of the present invention. Basically, the code-reading apparatus of the present embodiment is similar to the conventional code-reading apparatus shown in FIG. 2. The code-reading apparatus of the present embodiment comprises an image pickup section 6, a binarizing section 7, a binarized image memory 8, a reconstituting section 9, a demodulating section 10, and a reproducing section 11. The reproducing section 11 comprises memories 11A and 11B. The memory 11A stores data demodulated by demodulating section 10, and the reproducing section 11 corrects errors in data stored in the memory 11A, and also performs expansion processing for the data, thereby generating audio data. The memory 11B stores data of various types of warning sounds. According to a determination result regarding the scanning state (described below in detail), the reproducing section 11 reads out corresponding data of the warning sound from the memory 11B, thereby performing notification.

Figure 5:
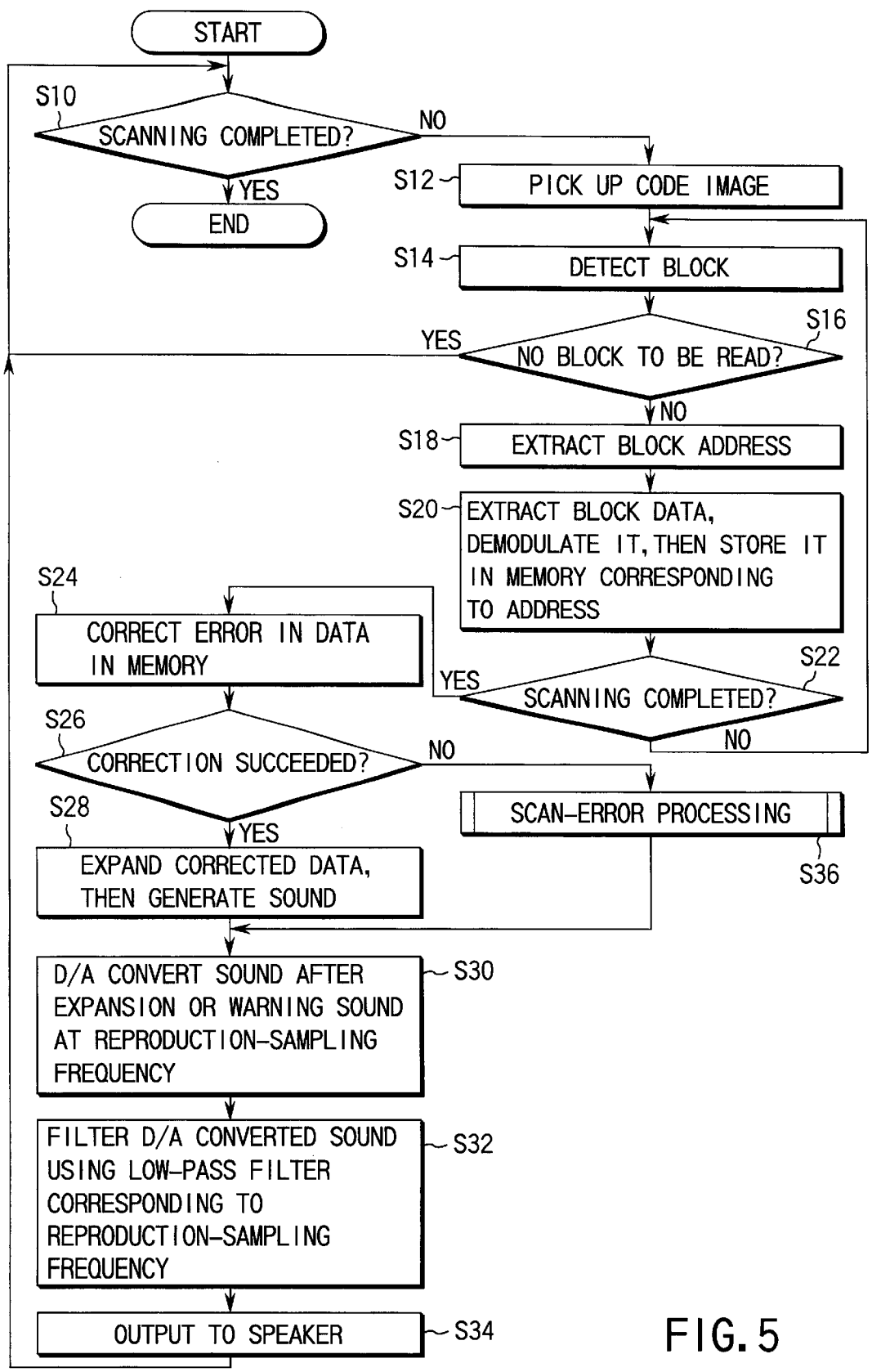
FIG. 5 is a flowchart showing a basic read-out operation in the code-reading apparatus of the first embodiment.

FIG. 5 is a flowchart showing a basic read-out operation performed by the code-reading apparatus of the first embodiment having the described configuration.

First of all, a system of the code-reading apparatus determines whether or not scanning is completed (step S10). The scanning status can be determined by, for example, checking the press-operation state of a scan button (not shown) that is pressed by an operator to indicate that manual scanning for a dot code 1 is in progress.

If scanning is not completed, that is, the scan button is in a pressed state, the image pickup section 6 performs picking up image of the dot code 1 as a code (step S12), subsequently the reconstituting section 9 performs block-detection (step S14), and thereby determines whether there exists blocks 2 that can be read out into a screen (step S16).

If no block 2 that can be read out still exists therein, operation returns to the step S10. If the block 2 that can be read out still exists, the reconstituting section 9 extracts a block address (step S18). After an intended block is read out, the block address determines a memory area for storing data thereof. Subsequently, the demodulating section 10 extracts block data and demodulates it; then, it allows the demodulated data to be stored in the memory 11A of the reproducing section 11 (step S20).

Subsequently, the system determines whether or not the scanning is completed (step S22). If the scanning is not yet completed, operation returns to the step 14 where block-detection is performed again.

If the scanning is determined to be completed, the reproducing section 11 performs error correction for the data stored in the memory 11A (step S24). Subsequently, the reproducing section 11 checks whether or not the error correction has succeeded (step S26). If the error collection is determined to have succeeded, expansion processing is performed for the error-free data, and audio data is then generated (step S28). For the error correction in the system of the present invention, a plurality of divisional processing steps are performed. First, in the step S20, information regarding an arrangement way for dot-code blocks is obtained from header information contained in part of the data when the demodulated data is stored. In addition, in the step S24, different header information is obtained; thereby, the system obtains information representing an error-correction method to be carried out in the step 24 and the total number of blocks. The headers are also subjected to error correction. If the header information cannot be generated, all the subsequent processes cannot be implemented. Therefore, the error correction for the aforementioned headers is programmed so as to have very strong capacity. Techniques about header information as described above are disclosed in, for example, U.S. Pat. No. 5,898,709; therefore, detailed information thereabout is omitted.

Subsequently, the audio data obtained at the step S28 is subjected to digital-analog (D/A) conversion at a reproduction-sampling frequency (step S30). Then, an audio signal produced after the D/A conversion is filtered by a low-pass filter at a frequency corresponding to the reproduction-sampling frequency (step S32). The filtered signal is then outputted to either a speaker or an earphone (step S34). Subsequently, operation returns to the step S10, where determination is performed again whether the scanning is completed.

If the step S26 determines the error correction to have been failed, the system executes scan-error processing, which will be described below in detail. Then, the system selects alarm-sound data corresponding to a cause for failure in reproduction (step S36), and subsequently, allows processing to proceed to the step S30. Step S30 performs D/A conversion for the alarm-sound data, thereby outputting the warning sound to either a speaker or an earphone.

In this configuration, a block 2 is detected from an image picked up by the image pickup section 6, and a header and data in the block 2 are read out. At this time, when the block detection has been achieved, information representing whether or not the block 2 corresponding to the read-out block address was already read out is stored in the memory 11A as block-detection-result information.

In addition, the block-detection-result information is referenced according to the address of the read-but block 2, and determination is thereby performed whether or not the block 2 has already been read out. If the block 2 is determined to be a not-read-out block, a position of the block-detection-result information, corresponding to the block address, is flagged. That is, a bit of the block-detection-result information, corresponding to the block address, is set.

Hereinbelow, a description will be given of the scan-error processing executed in the step S36.

Figure 6:
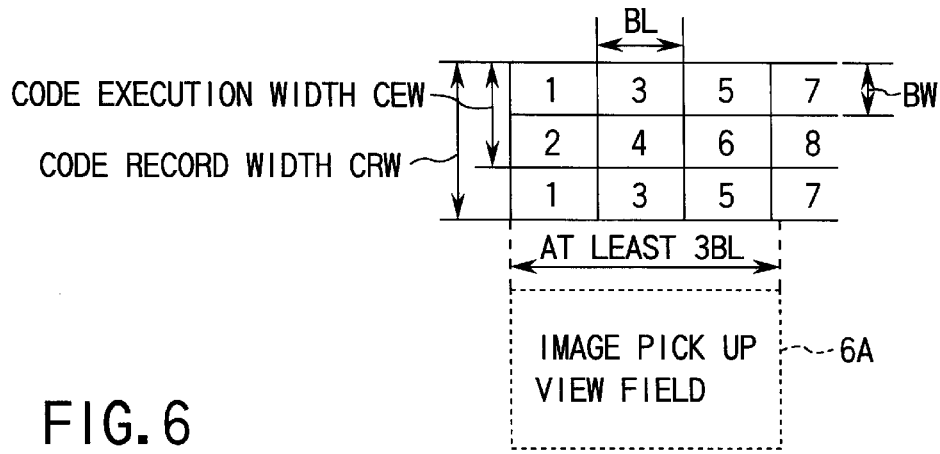
FIG. 6 is a view showing the relationship between a block arrangement and an image pickup view-field size in a code-reading apparatus.

The description will be given referring to FIGS. 7 and 8 and assuming that a dot code 1 has a block arrangement as shown in FIG. 6, and an image pickup view field 6A has a size in which a vertical length (in the direction perpendicular to the scanning direction) is equal to or larger than three times of a vertical width BW of the block 2, and a horizontal length is equal to or larger than three times of a horizontal width BL of the block 2.

Figure 7:
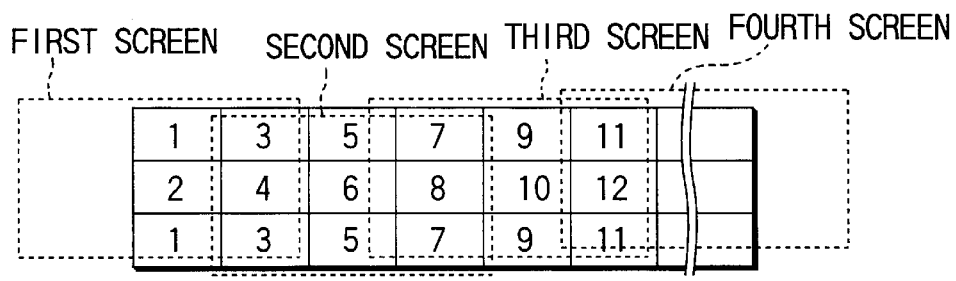
FIG. 7 is a view showing a moving state of the image pickup view field.
Figure 8:
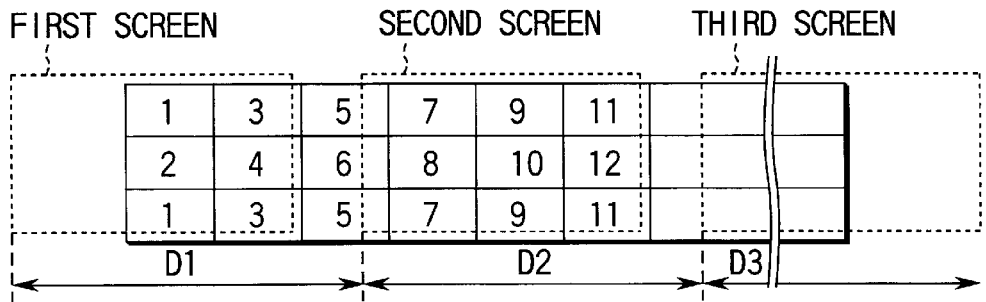
FIG. 8 is a view showing a moving state of the image pickup view field at high-speed scanning.

Specifically, when the image pickup view field 6A of the image pickup section 6 moves with scanning movement, a plurality of the picked up blocks is reconstituted, and all the blocks are picked up as shown in FIG. 7, information recorded as the dot code 1 is reproduced. If many blocks are not picked up as shown in FIG. 8, the information is not reproduced.

With a CCD used in an ordinary video camera and the like, the cycle of image output from the image pickup section 6 is such that about one field of image is captured in a period of 15 to 20 ms. Also, to prevent out-of-focus or blooming images, image pickup is performed with shuttering or light-source emission of about 100 µs.

That is, images are picked up at an interval of 15 to 20 ms. When the scanning speed is excessively high, there occur blocks that are not picked up; therefore causing a case where reproduction cannot be performed. Assumption is made such that the vertical width BW of one block be 2 mm, and the horizontal width BL thereof be 2 mm, the image pickup view field 6A have the size of 6 mm (vertical length)×6 mm (horizontal length). In the image pickup section 6 having the aforementioned image pickup size, one-shot operation allows two vertically aligned blocks and two horizontally aligned blocks to be securely picked up. Also, when the image pickup cycle is assumed to be 20 ms, the image pickup section 6 moves for scanning in the period of 20 ms, and the image pickup view field 6A is also moves. When the dot code 1 having the block arrangement shown in FIG. 6, scanning must be performed at a maximum speed of 300 mm/s so as to securely pick up all blocks 2. A calculation method therefor is described below.

A method for calculating a maximum scanning speed V must satisfy two conditions given below. In this method, D represents an integer section of a value that represents the amount of movement measured by the number of blocks, the movement being made at the maximum scanning speed V in the period of an image pickup cycle T.

Condition 1: In consecutive two screens in all the screens that are captured in scanning, block addresses read out in the previous screen and block addresses read out in the following screen must be consecutive with no omission occurring.

Condition 2: The movement amount D must be the maximum number of blocks that satisfies the condition 1 even when the two consecutive screens are captured at any timing.

Therefore, the calculation method is:

Maximum scanning speed V≈(D: the number of blocks in the scanning direction, which can be securely picked up)× BL/T.

Figure 9:
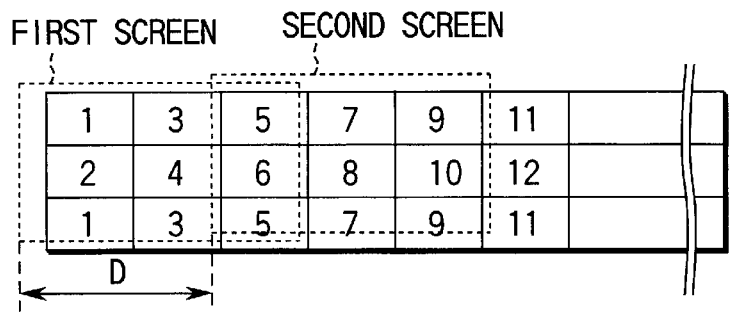
FIG. 9 is a view showing a movement amount in a scanning direction, for which image pickup can securely be performed.

In the case of the maximum scanning speed V for the dot code 1 having the block arrangement shown in FIG. 6, since the amount of movement D≈2 as shown in FIG. 9, the calculation method is:

Maximum scanning speed V≈2×2/0.02=200 mm/s.

As described above, at a scanning speed of up to about 200 mm/s, all the blocks 2 can be securely picked up. However, when scanning is performed at a speed higher than the above, since there occur blocks that are omitted in scanning, secure reproduction of the original multimedia information is impossible.

In the case where blocks are omitted in overspeed-scanning, blocks that are not read out, that is, "omitted blocks," and "read-out blocks" occur in characteristic patterns.

Figure 10:
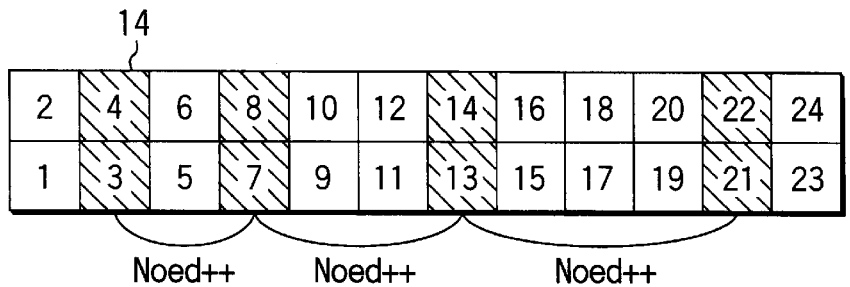
FIG. 10 is an explanatory view of omitted blocks at overspeed scanning.

For example, FIG. 10 shows a dot code having a block arrangement of 24 blocks in two effective lines. Also, each rectangle in the figure represents a block 2, and a number therein represents a block address (this presentation way will be the same in other cases described below).

Figure 11:
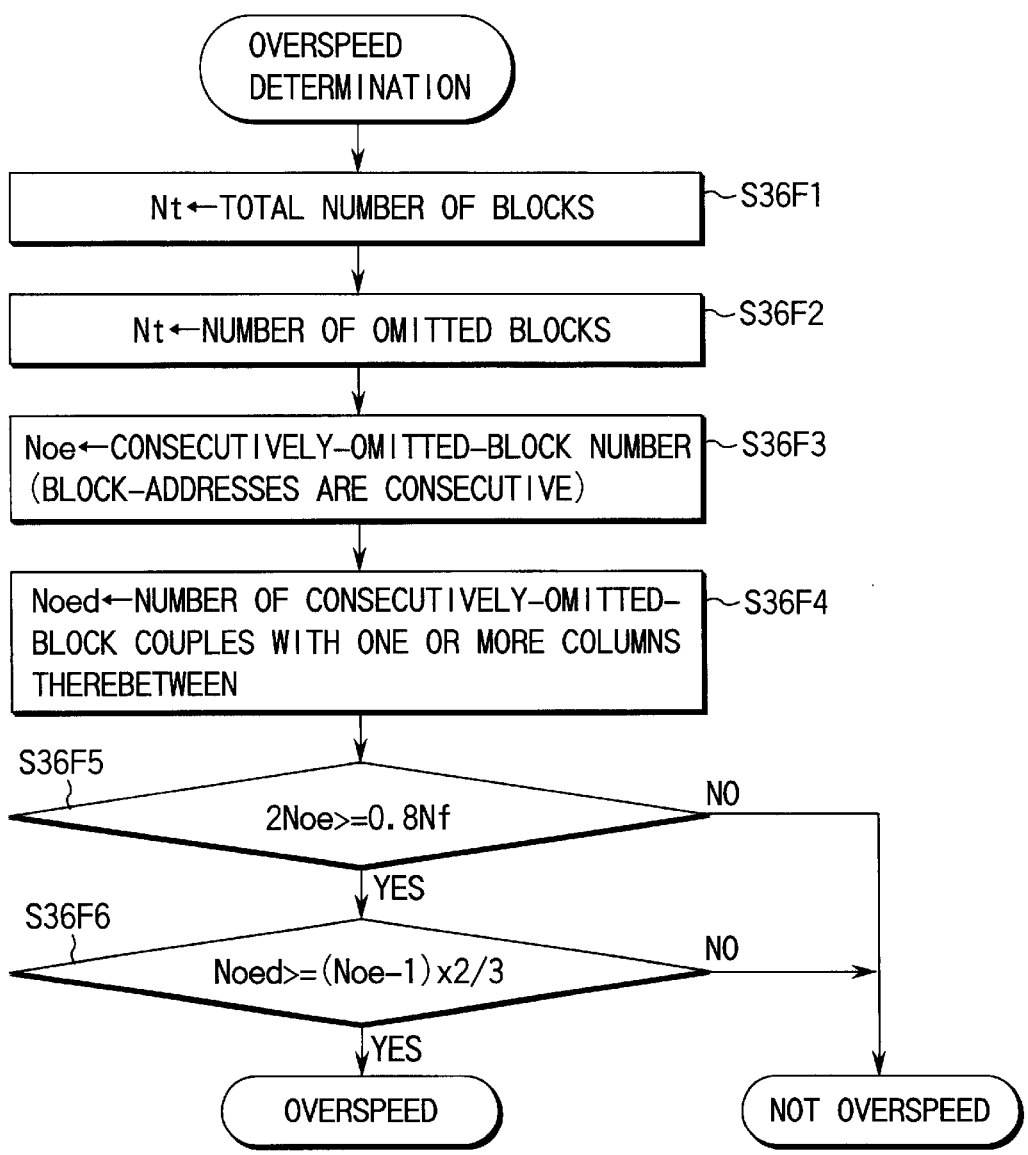
FIG. 11 is a flowchart of overspeed-determining processing in the first embodiment.

When the code as shown in the figure is scanned at an overspeed, the blocks shown in hatched portions are omitted in the scanning, as shown with reference symbol 14 in the figure. At this time, the omitted blocks 14 occur skippingly with intervals in units of coupled blocks, the blocks in each of the couples are vertically adjacent to each other (which will be referred to as consecutively omitted blocks). Therefore, if these characteristic patterns can be detected, overspeed scanning can thereby be detected. As a matter of course, there may be a case where the consecutively omitted blocks consecutively occur in the horizontal direction in the figure, that is, in the scanning direction, and the "read-out blocks" may occur skippingly with intervals. An overspeed-scanning detection method will be described below with reference to FIG. 11.

The area of the block-detection-result information in the memory 11A must be configured so as to record a detection result of a larger number of block addresses than the maximum number of blocks of a code intended to be read by the reading apparatus. Generally, at start of reading, the area is totally reset, and then, bits in the area corresponding to detected block addresses are set. For example, a system having a capacity of reading out at most 500 blocks allows the area of block-detection-result information to record a detection result of at most 500 blocks as the information represented by 500 bits. On the other hand, in a code that has been read out contains only block address represented by numbers ranging from "1" to "100", the first to 100th bits are significant, but other bits remain in the reset state.

According to the present embodiment, first of all, the system obtains a total number Nt of blocks included in a code that has been read out (step S36F1). Generally, the total number Nt of the blocks is obtained from header information recorded in part of the code. However, even a method of using the maximum block-address value allows substantially the same advantage to be obtained.

Subsequently, considering the known information, that is, information regarding the way of block arrangement (for example, information indicating that the number of effective lines is two), information corresponding to a Nt bits is searched for, and read-out blocks and not-read-out blocks are identified. Thereby, the omitted blocks 14, that is, the not-read-out blocks, are-counted as Nf (step S36F2); and also, couples of blocks, each having two-consecutive addresses (consecutively omitted blocks), in the omitted blocks 14 are counted as Noe (step S36F3). However, a condition is applied that, in each couple of the consecutively omitted blocks that is counted as Noe, an odd-number address must be smaller than an even-number address. This condition is applied to this case because, as the addresses "5" and "6" in FIG. 8, the omitted blocks 14 refer to blocks that cannot be completely set within the image pickup view field 6A, and, in most cases, sets of blocks vertically aligned are omitted in scanning. Therefore, the above condition serves to decrease the probability in erroneous determination of blocks consecutively omitted by coincidence due to noise to be blocks omitted due to overspeed scanning. Specifically, for example, in the arrangement as shown in FIG. 10, the omitted blocks 14 occur conditionally on that blocks in each of the couples are consecutive as "3" and "4"; therefore, blocks that would be consecutive as "2" and "3" in the couple are not counted as the omitted blocks.

Moreover, in the present embodiment, in a case where couples of the consecutively omitted blocks that are apart from each other at an interval of one or more columns (of blocks) are counted as Noed (step S36F4). This verifies that the individual block couples are omitted skippingly with the interval; therefore, a condition in this case is that read-out blocks must always exist between the consecutively omitted blocks, and the omitted blocks 14 that satisfy the this condition are counted. This condition prevents erroneous determination for blocks consecutively omitted by accident in a bursting state to be the consecutively omitted blocks occurring due to the overspeed scanning.

Based on the above, determination is performed according to a condition that at least 80% of the omitted blocks Nf belong to the consecutively omitted blocks (step S36F5). Specifically, since the consecutively omitted blocks include the blocks in the units of two blocks, the number of the omitted blocks is obtained by doubling the consecutively omitted blocks Noe, the condition is made such that the ratio of the number of the blocks relevant to the consecutively omitted blocks to the total number of the blocks is at least 80%, and the determination according to this condition is included in the processing as a first determination.

Furthermore, determination is made for a case where the number of blocks in the couples of the consecutively omitted blocks that are apart from each other at an interval of one or more columns, that is, the value exceeds a value obtained by subtracting "1" from the number of the consecutively omitted blocks (Noe) and by multiplying the output by $\frac{2}{3}$ (step S36F6). If the result meets the condition, the case is determined as overspeed. As described above, the second determination determines that read out blocks exist at a certain probability in occurrence of consecutively omitted blocks, thereby verifying that omission of consecutive blocks occurs in non-bursting state in many portions. Therefore, the probability is set as $\frac{2}{3}$ in the preferable example.

For example, in the case of the arrangement shown in FIG. 10, the total block number Nt is 24, the number of the omitted blocks Nf=8, Noe=4, Noed=3, 2Noe=2×4=8, and 0.8Nf=0.8×8=6.4. Accordingly, this case is determined to be true in the aforementioned first determination. Concurrently, since (Noe−1)×$\frac{2}{3}$=(4−1)×$\frac{2}{3}$=2, the case is also determined to be true in the aforementioned second determination. Accordingly, the example case is determined to be the overspeed.

According to the above, the overspeed is determined by both the first determination and the second determination; however, only one of them may be used for the overspeed determination, thereby producing advantages of, for example, reducing the determination time.

Hereinbelow, a description will be given of determination for scan deviation occurring when the image pickup section 6 is moved in off-code state during read-out operation.

A brief description will be given of a phenomenon called off-code (scan deviation).

As shown in FIG. 6, with the image pickup view field 6A having the size larger than three times of the size of the block 2, tolerance for meandering of scan is proportionally large. However, in an out-of-tolerance case or in a case where the size of the image pickup view field is not as sufficiently large as the above for the blocks 2, when the meandering amount is large, the code deviates from the image pickup view field, resultantly causing omitted blocks that have not been picked up in the screen. Also in this case, blocks are omitted in a characteristic pattern; therefore, using block-detection-result information and according to the characteristic pattern, an off-code state in read-out processing can be detected.

In the off-code state, as shown in the hatched portions in FIG. 12, the omitted blocks 14 tends to occur concentrative on one side.

This is caused because the image pickup section 6 meanders at a relatively low speed and deviates from the code, and after the image pickup section 6 once deviates from the code, blocks on the side are continually omitted for a while.

In view of the above, to detect the off-code state, it is preferable that a method as shown in FIG. 13 be employed. Hereinbelow, a detailed description will be given regarding this method.

First of all, the system obtains a total block number Nt (step S36C1).

Subsequently, in consideration of the information regarding the block-arrangement way, the system identifies read-out blocks from the block-detection-result information and not-read-out blocks therefrom, and searches for omitted blocks 14. Then, it measures the number of the omitted blocks 14, one of horizontally adjacent blocks of the omitted block 14 being omitted, and concurrently, one of vertically adjacent blocks thereof existing, and assumes the measurement result to be N1 (step S36C2). Thus, N1 represents the number of blocks that are consecutively omitted in the direction parallel to the code-scanning direction, and concurrently, that are not consecutively omitted in the direction perpendicular to the code-scanning direction. For example, in FIG. 12, N1 represents the value "3" (omitted blocks: "15", "17", and "19").

Finally, the system determines whether or not N1 is equal to or larger than a threshold (step S36C3). If the result meets the condition, the case is determined to be code-off.

As in the present embodiment, in the system that has either a recording method preliminarily known or a recording method preliminarily known to have no large variation, the aforementioned threshold may be preset to 4% of the total block number Nt, thereby allowing the processing to be simplified.

Also, it is a matter of course that the threshold for use in the processing may be set appropriately according to the information regarding, for example, code-recoding ways. Specifically, using error-correction-level information, the threshold may be predetermined from the ratio of the number of blocks that are determined to be "irreproducible" to the number of blocks included in the entire code. This produces an advantage in that causes for errors occurring in actual code-scanning can be accurately determined.

Hereinbelow, a description will be given of errors occurring when the entire code is not read out.

By nature and as a prerequisite condition, the dot code 1 allows all the blocks to be read out. However, scanning thereof is occasionally terminated on its partway for some reasons. Example reasons are described below.

The dot code 1 allows a plurality of the blocks 2 to be connected, thereby increasing the number of the blocks;

accordingly, it also allows increase in the amount of information that can be stored therein. However, although the length of the code is intended to be increased by increasing the amount of information, there are many cases where the length is restricted by the size of paper sheets. In such a case, the code may be freely separated so that individual divisional codes have appropriate number of blocks.

Since the original source of the divisional codes is one code, complete information can be obtained upon completion of scanning of all the divisional codes. However, some users are not aware that these individual codes are divisional codes described above and perform scanning for each of the divisional codes as an independent code. Such scanning results in that the complete information is not available. In this example case, as shown in FIG. 14, a code composed of blocks "1" to "48" is separated into two codes, one code having the blocks "1" to "24", and the other code having the blocks "25" to "48". However, reproduction was performed without scanning the latter code, and as a result, the hatched omitted blocks 14 were omitted.

Hereinbelow, a method for detecting the above is described below with reference to FIG. 15.

First of all, the system obtains the total block number Nt from the header information (step S36I1). Subsequently, in consideration of the information regarding the block-arrangement way, the system identifies read-out blocks from the block-detection-result information and not-read-out blocks therefrom, and searches for omitted blocks 14. Then, the system measures the number of an omitted-block number Nf (step S36I2), and also, measures the number of consecutively omitted blocks, thereby obtaining a maximum consecutively-omitted-block number Ndmax (step S36I3). Subsequently, if a case that satisfies the conditions that the omitted-block number Nf is at most ¾ of the total block number Nt, and concurrently, the maximum consecutively-omitted-block number Ndmax is at least 30% of the total block number Nt (step S36I4), the case is then determined to be a code-on-partway state.

Now, the example case shown in FIG. 14 is applied to the above. In this case, the total block number Nt=48, the omitted-block number Nf=27, and the maximum consecutively-omitted-block number Ndmax=26, ¾Nt= (¾)×48=36. Therefore, the case is determined to be equal to or larger than Nf. Concurrently, since 0.3Nt=0.3×48=14.4, the case is determined to be equal to or smaller than Ndmax. Accordingly, the example case is determined to be the code-on-partway state.

Figure 15:
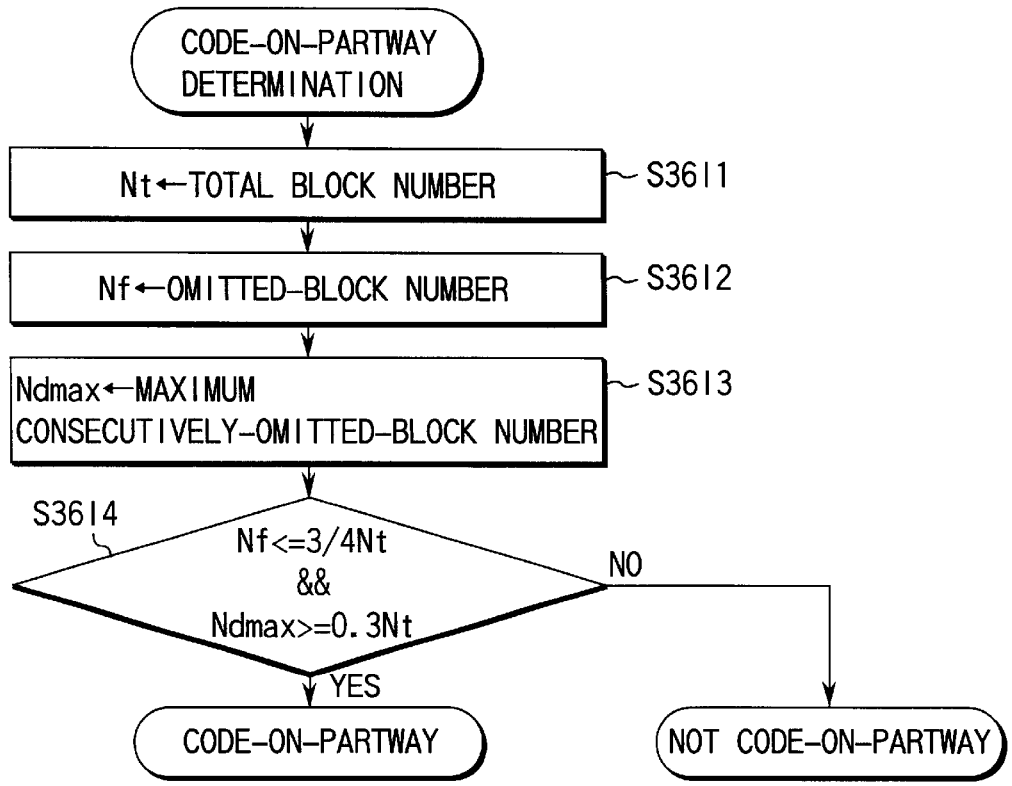
FIG. 15 is a flowchart of code-on-partway-determining processing in the first embodiment.
Figure 16:
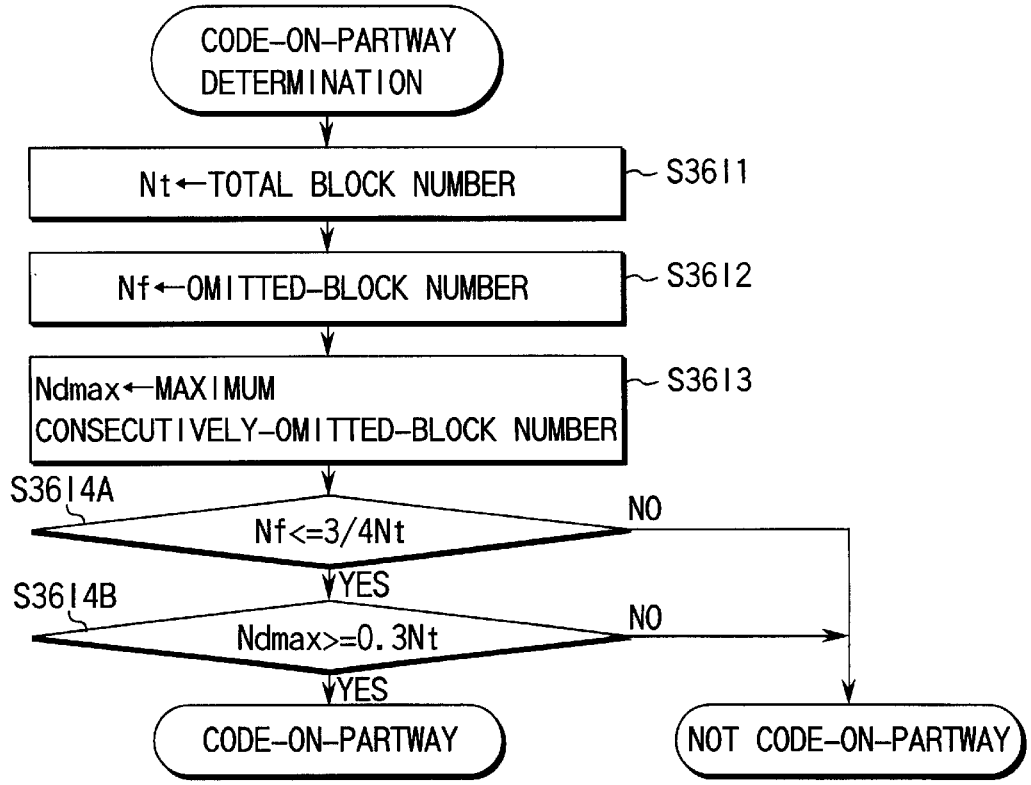
FIG. 16 is a flowchart used to explain another example of code-on-partway-determining processing in the first embodiment.

According to the example method in FIG. 15, the above-described two determinations are incorporated into one determination. However, as a matter of course, the two determinations may be performed independently of each other, as in steps S36I4A and S36I4B in a method shown in FIG. 16. The resultant effects of the two example methods are completely the same.

In the above, the earlier determination verifies that the number of the omitted blocks is at most ¾ of the total number of blocks; that is, ¼ of all the blocks are read out. In other words, since the method is programmed on a prerequisite condition that a predetermined number of blocks is properly scanned, the determination is performed on condition that an appropriate number of the blocks is read out. The numeric value was determined from the fact that, in most cases, a divided code is arranged to be at most three divisional codes. Specifically, complete read-out of only one code allows ⅓ of blocks to be read out, the value is determined as a threshold in consideration that some of the blocks will be omitted by erroneous scanning operations. As a matter of course, however, by optimization according to the divisional number of codes that can be handled by the system, the accuracy in the determination is further improved.

The latter determination performs determination from the fact that, in most cases, the ratio of portions omitted consecutively, that is, in a bursting state, to the entire code is at least 30%. This numeric value is also presumably determined; specifically, it is predetermined using the finding that, when complete scanning is not performed for at least one of three divisional codes, at least 33% of the blocks are always omitted.

Figure 17:
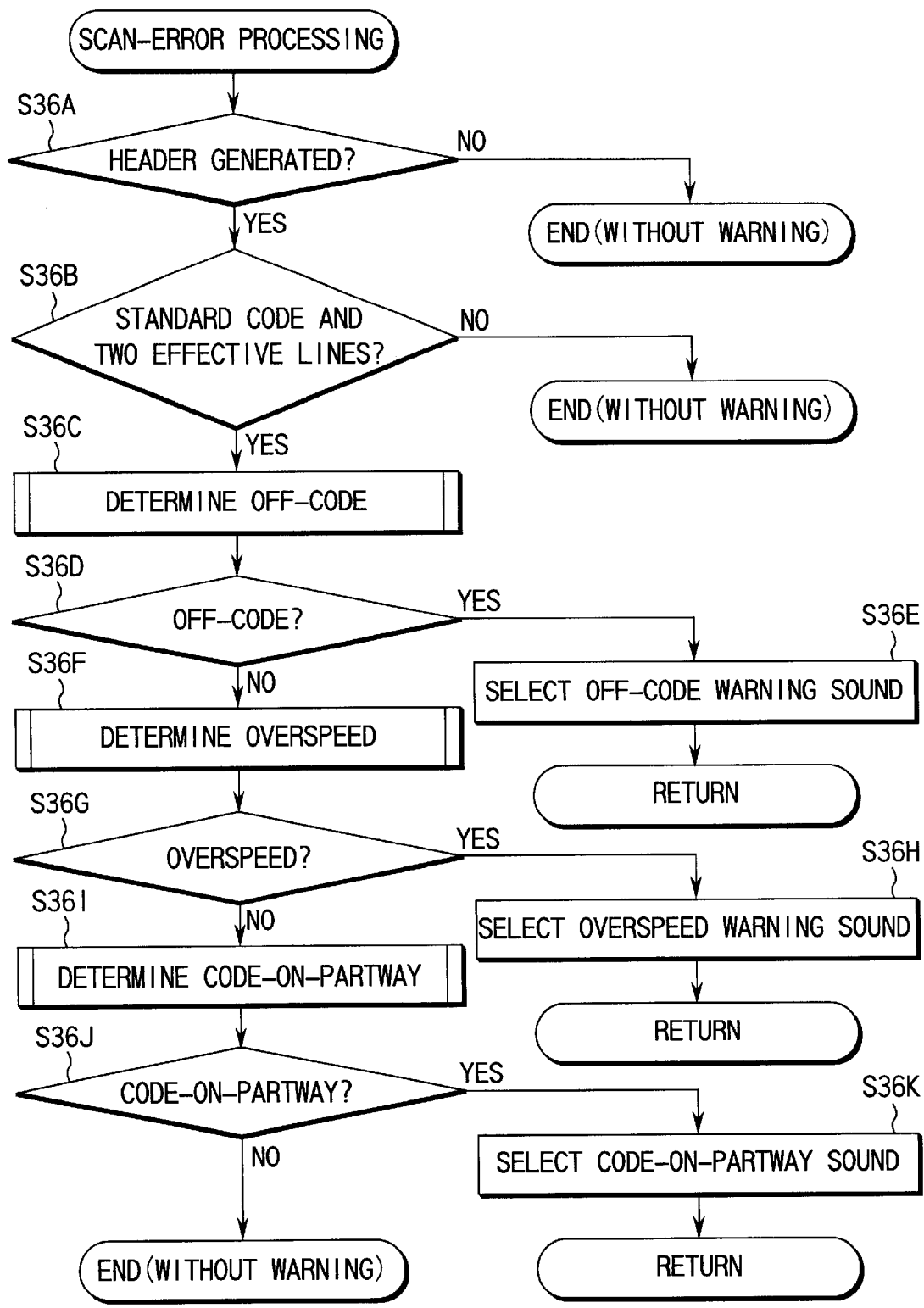
FIG. 17 is a flowchart of scan-error processing in the first embodiment.

Hereinbelow, referring to FIG. 17, a description will be given of a scan-error processing executed in the aforementioned step S36, which uses the scan-error-cause-determination method (scan-state-determination method) as described above.

In the processing, when audio reproduction cannot be performed because of abnormalities in a recording medium and/or scanning, the cause of a scan error is determined according to read-out block information, and warning is performed according to the determination results.

The error-cause determination is performed when all the following conditions are satisfied:

A header (for example, a macroblock header disclosed in the above-referenced U.S. Pat. No. 5,898,709) is successfully generated;

A code having two effective lines is being read; and

As a block-arrangement way, a standard code according to standard specifications (non-expansion code) is being read.

First of all, the system verifies these conditions (steps S36A and S36B). If these conditions are not satisfied, the processing is terminated.

If the aforementioned conditions are satisfied, the off-code determination as described above is first performed (step S36C). If an off-code state is detected (step S36D), the system selects a predetermined off-code warning sound whose data is stored in the aforementioned memory 11B (step S36E) and allows control to return to an upper routine.

If an off-code state is not detected, the system performs an overspeed determination (step S36F) as described above. If an overspeed state is detected (step S36G), the system selects a predetermined overspeed warning sound whose data is stored in the memory 11B (step S36H) and allows control to return to an upper routine.

If an overspeed state is not detected, the system performs a code-on-partway determination (step S36I) as described above. If read-out is terminated on a partway of the code (step S36J), the system selects a predetermined a code-on-partway warning sound whose data is stored in the memory 11B (step S36K) and allows control to return to an upper routine.

The off-code warning sound, the overspeed warning sound, and the code-on-partway warning sound are individually arranged to be unique. For example, as a way to arrange the individual sounds to be unique, it can be considered that the repetition number of audio outputs of a sound as !!"pis"!! is changed, and the frequency or the type of the sound is changed.

In the above, the determinations are performed in the order of the off-code determination, the overspeed determination, and then the code-on-partway determining for the following reasons.

In many cases, each of the errors described above is attributable not only to a single cause, but also to combined causes. An example case is that scanning is performed at an overspeed, and also, in an off-code state. This case arises a problem in determining as to which one of the warnings must be issued. To solve this problem, the priority is set for the warnings to allow the determinations to be performed in the ascending order of the precedence (i.e., sequentially from the highest priority). In the described example, warning for caution and attention is appropriately performed for the off-code state that can occur at the highest frequency, and then, warning is performed to call for caution on the overspeed that can occur at the second highest frequency. The final error that interrupts scanning on a partway of the code is caused in such a case where a user scans without being aware of grouped divisional codes. In this case, after the user is once guided so as to be aware of the cause for the error, the error can almost be prevented in the subsequent operations. For this reason, the warning for the error of code-on-partway is given the lowest priority.

Hereinbelow, a brief description will be given of reasons for provision of the aforementioned conditions that are verified prior to the determinations.

The scan-error-cause determination is performed according to the total number of blocks in the code, the block-arrangement way, and the read-out block information. In this case, the header generation is mandatory to obtain the total number of blocks; therefore, prior to the execution of the error-cause determination, the verification is performed for the header obtained, thereby allowing the cause determination to be implemented only when the header has already been obtained.

Also, the error-cause determination is implemented on a prerequisite condition that the blocks are arranged so as to be aligned, and the code is composed of two lines as the number of effective lines. This prevents the error-cause determination from being effected for such a code as composed of blocks in a random arrangement. The number of effective lines refers to the number of addresses that differ from each other in the direction perpendicular to the scanning direction. Therefore, the individual codes shown in FIGS. 10, 12, and 14 also have two lines as the number of effective lines. Also, the code in FIG. 6, in which the one or more lines of blocks having the same contents are recorded, has two lines as the number of effective line.

Hereinbelow, a code composed of blocks in the random arrangement is explained.

Arrangements of individual blocks of dot codes include a recommended block arrangement, that is, an arrangement called a standard code; and in addition, an expansion code that allows addresses of the blocks to be freely arranged. As one aspect that is most different from the standard code, the expansion code has characteristics that do not require the block addresses to be sequentially arranged. This makes it to be difficult to perform the error-cause determination for the expansion code by using the determination information that have been described. For this reason, the error-cause determination is not performed for the expansion code; therefore, the error-cause information is not provided.

The aforementioned expansion code is composed such that the block addresses contain data indicating the code to be the expansion code, and detection thereof allows identification of the code to be the expansion code even at an earlier stage of code-read-out processing.

SECOND EMBODIMENT

Hereinbelow, a description will be given of a second embodiment according to the present invention.

The block-detection-result information has a capacity of performing one-bit presentation about whether or not read-out is performed. In addition, it also has a capacity of using multiple bits to store a read-out-trustworthy level that represents a data-reliability level according to the position and the like in the image pickup view field when the read-out is performed. In such a case, the amount of information for determinations is further increased, thereby allowing high-accuracy determinations to be implemented.

For example, in a case where a result of read out at an end of the image pickup view field are stored as the read-out-trustworthy level, from the fact that a block read out at an end of the image pickup view field 6A exists, it can be known that the image pickup section 6 is about to be off the code.

As a way that allows the block-detection-result information to store the above instance, an example of allowing it to have information of two bits for each block is given below. The first bit and the second bit are set as follows:

First bit: A flag representing information as to whether read-out has been performed, and Second bit: A flag representing information that a block overlaps with an end of a screen.

Checking of the flag of the first bit makes the state to be the same as in the case of the described first embodiment. In addition, use of the flag information in the second bit allows a state where the block has been read out to be directly determined. That is, the state of the flag being turned on represents a state where omission of the block is just about to occur.

Figure 18:
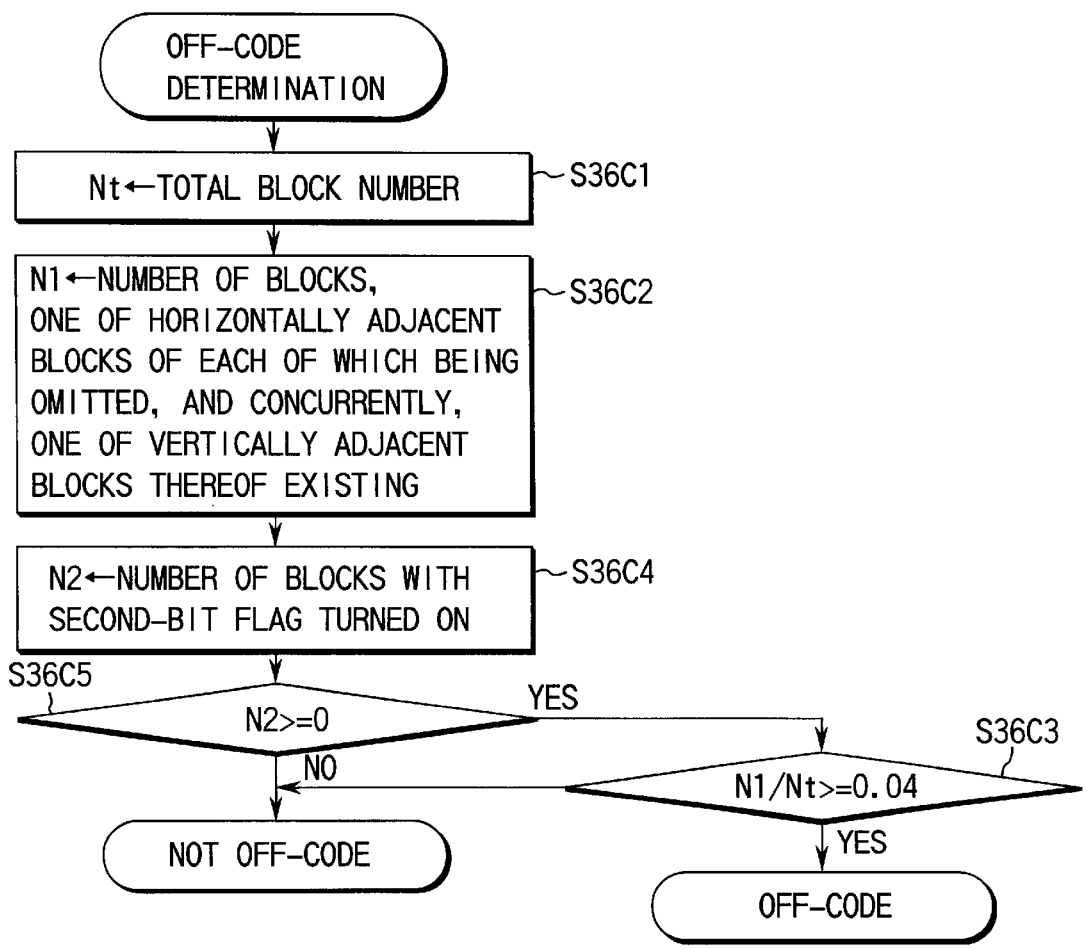
FIG. 18 is a flowchart of off-code-determining processing in a second embodiment of the present invention.

Hereinbelow, referring to FIG. 18, a description will be given of off-code determining processing using the aforementioned flag.

Steps S36C1 and S36C2 are the same as in those shown in FIG. 13.

Then, the number of blocks each having the second bit turned on is arranged to be represented by N2 (step S36C4). If N2 is 0 (step S36C5), the case is determined not to be in an off-code state. Then, if even a single block has the bit turned on, the system determines whether or not N1/Nt is at least 4% (step S36C3).

According to the above processing, since it can be verified that the code gradually deviates from the screen, the probability in erroneous determination to be the off-code state can be decreased.

Figure 19:
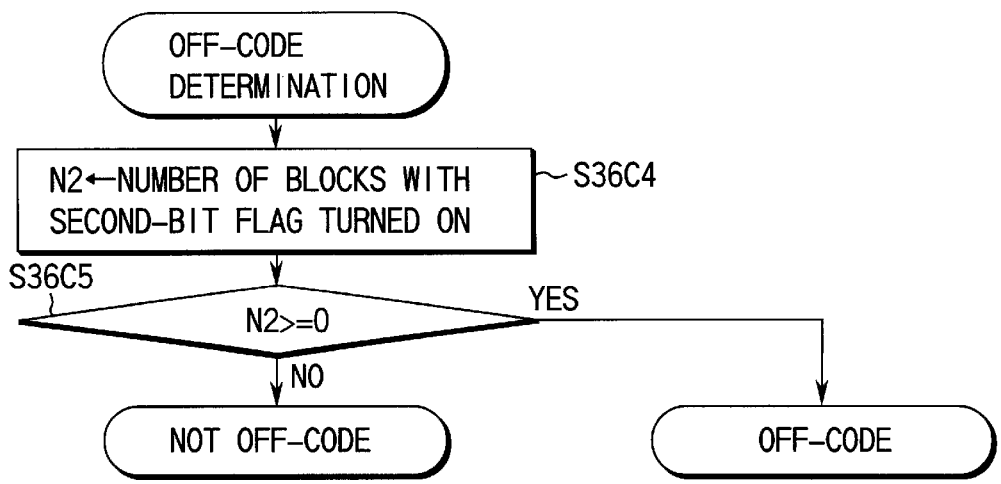
FIG. 19 is a flowchart of another example of off-code-determining processing in the second embodiment of the present invention.

Furthermore, to simplify the processing, it may be arranged such that, at the step S36C5 where N2 is determined not to be 0, the determination in step S36C3 be bypassed, and the case be directly determined to be in the off-code state. In this case, as shown in FIG. 19, since steps S36C1 to S36C3 can be bypassed, much processing time can be saved.

THIRD EMBODIMENT

The above embodiments have been described with reference to examples in which the errors are determined after completion of scanning. However, in either a case where the described tendency is apparent or a case where the tendency can be forecast during the scanning, the determination can be performed at that time.

Hereinbelow, using FIG. 12, a description will be given of the aforementioned case with reference to an example of the off-code determination.

As already described in the above, the off-code determination can be implemented according to the fact that the omitted blocks 14 consecutively occur on one side of the code.

Specifically, the reading apparatus is designed to perform read-out in the units of coupled two blocks that are vertically in contact with each other from the image of the code that is picked up into each screen. However, when the off-code state occurs, since only one of them can be read out, the off-code state can be determined at that time.

According to the above, an arrangement can be made such that, even in read-out processing, the off-code state is determined, and a warning is immediately issued, thereby allowing the subsequent scanning operations not to be ineffective. Alternatively, by allowing the reading apparatus to perform feedback operation during scanning, a warning can be issued for proper scanning before the omitted blocks 14 occur so as to cause a complete error. This provides advantages in that the probability of complete errors can be reduced, and in addition, a training function for scanning is provided to improve scan-skills of users.

APPLICATION EXAMPLES

Hereinbelow, a description will be given of an example of application of the described dot codes and code-reading apparatus to an instruction manual for an electronic apparatus including the code-reading apparatus.

There are many electronic apparatuses that are usable by blind persons. However, most of actual instruction manuals are written in a text form and intended for non-handicapped persons.

In view of the above, as shown in FIG. 20, in the margin of an instruction manual (recording medium 13) on which a text 15 and an illustration 16 are printed, audio information (verbally read records) of the text 15 is printed as a code image of a dot code 1. This allows the instruction manual (recording medium 13) to also be usable and understandable even to blind persons.

Also, for example, for the aforementioned electronic apparatus configured such that, when it is incorrectly operated, a safety device functions to stop the operation and provides a warning sound, the instruction manual (recording medium 13) has the text 15 saying that "When a sound as 'xx' is provided, . . . ". In this case, the manual may be arranged such that the actual warning sound be dot-coded, and a dot-code 1 be printed and recorded in the vicinity of the text 15.

According to the arrangement as in the described example, sounds that are difficult to be presented in characters can actually be heard. It is a matter of course that the present invention provides a significant advantage even to non-handicapped persons.

As shown in FIG. 22, with multiple warning sounds provided so as to be unique to each other depending on the type of the warnings, the advantage is particularly apparent.

This figure shows an instruction manual (recording medium 13) for the reading apparatus 12 that reads out the dot code 1. On a page of this instruction manual (recording medium 13), an actual warning sound represented by a character expression as !!"pom"!! included in a text 15-1 is printed and recorded as a dot code 1-1 in the vicinity of the corresponding text 15-1. Similarly, other actual sounds are printed and recoded as dot codes in the individual vicinities of corresponding texts. Specifically, they are represented by the character expression !!"pom hyoom"!! included in a text 15-2 as a dot code 1-2, the character expression !!"pom hyui"!! included in a text 15-3 as a dot code 1-3, and the character expression !!"pom powat"!! included in a text 15-4 as a dot code 1-4.

Hereinbelow, another application example is described. In a particular case of application of the present invention to the instruction manual (recording medium 13) for the reading apparatus 12 that reads out the dot code 1, a method other than the method of printing and recording actual warning sounds as code images allows the individual warning sounds to be outputted.

The method is characterized as follows. Predetermined damage is preliminarily provided on the dot code 1 printed and recorded on the instruction manual (recording medium 13) for the code-reading apparatus that reads out the dot code 1. Thereby, even when the reading apparatus 12 reads out the dot code 1, warning sounds printed and recorded as individual dot codes 1 are not outputted. As a result, as described in the individual embodiments, the reading apparatus 12 actually outputs the warning sound instead of the sounds reproduced from the individual dot codes 1.

For example, as described above and as shown in the hatched portions in FIG. 12, when an off-code state caused in the case where the omitted blocks 14 occur concentrative on one side is detected, the reading apparatus 12 reads out the warning sound (!!"pom hyui"!! in the example shown in FIG. 22) that represents the off-code state from the memory 11B and produces the warning sound. Therefore, to present the warning sound corresponding to the off-code state in the instruction manual (recording medium 13) by using the dot code 1, the warning sound is not recorded in the dot code 1-2 as the sound state. However, in a case where the dot code 1-2 is read out, when the blocks 2 are omitted as if the off-code state occurred, the same warning sound can be generated.

For example, as shown in FIG. 23, the dot code 1-2 is arranged such that the block addresses "16", "18", "20", "22", and "24", are assigned to blocks that correspond to the five blocks having the block addresses "15", "17", "19", "21", and "23" shown in FIG. 12. In this case, when the dot code 1-2 is scanned, even if the scanning is properly performed, the five blocks having the block addresses "15", "17", "19", "21", and "23" are omitted. Therefore, the reading apparatus 12 determines the case to be the off-code state and generates the corresponding warning sound.

In this case, compared to the method of recording the audio data as the dot code, the alternative method is more flexible such that read out of an appropriate number of the blocks 2 is effective, and any data is effective as the data that is recorded in the data-dot pattern section 3 of the block 2. Resultantly, this method produces advantages in that the required number of blocks of the dot code 1 can be reduced, and the error-correcting symbols need not be added since the data in the blocks is not significant.

Particularly, the first advantage is effective as follows. With the dot code 1 composed of only about 24 blocks, since only a sound shorter than one second can be outputted, it is not sufficient for human being to easily hear as a normal sound. However, according to the arrangement as the described application example, since even the aforementioned dot code 1 is enabled to output a warning sound, it is very advantageous in use for the instruction manual in which the margin space on the paper sheet is restricted because of the text 15 and the illustration 16.

Also, for the other dot codes 1-3 and 1-4, a block-address configuration may be made such that blocks similar to the omitted blocks 14 shown in FIGS. 10 and 14 are omitted.

In the above application examples, the description has been given of only the examples in which only the audio information is dot-coded. According to the present invention, however, in addition to the audio information, so-called multimedia information including video information and text data may be arranged so as to be printed and recorded in instruction manuals. In this case, as a matter of course, the present invention allows users to improve their understanding regarding the contents of the instruction manuals.

Hereinbelow, a description will be given with reference to an example of an instruction manual for a computer as an electronic apparatus.

For users to learn operation methods based on a computer instruction manual, referring to the instruction manual, they executes operation corresponding thereto. A recent computer is provided with a CD-ROM being accompanied. The computer is configured to allow the CD-ROM to be used to display the computer operation methods as video images on its monitor, through which the explanation is given through the video images.

In stead of the CD-ROM, for use of an instruction manual as described above, for example, a dot-code reading apparatus is arranged so as to be connected to the computer, and the instruction manual contains dot codes printed and recorded on the prerequisite condition that the dot codes are progressively read in the state where the reading apparatus is connected to the computer.

According to the aforementioned instruction manual, on a screen prompting for key-input of a command from a keyboard, the command can be inputted by using the reading apparatus and allowing it to read out the dot codes printed and recorded in the instruction manual instead of actually key-inputting the command. At this time, a configuration may be such that the contents of signals actually read out be informed to the user for confirmation of the keys through sounds, and the signals be transferred to the computer upon confirmation by the user. This configuration produces an advantage of preventing erroneous read-out.

Also, an arrangement may be such that, also for items explaining the screen movement of the computer, code images printed in the instruction manual be read out by the reading apparatus to allow multimedia information recorded therein to be reproduced on screens of the computer.

Moreover, an arrangement may be such that, in a case of using the CD-ROM together with the instruction manual, instruction for read-out of signals in the CD-ROM be issued through the dot codes printed in the aforementioned instruction manual.

As described above, in the instruction manuals for the electronic apparatuses, the so-called multimedia information including video information and text data in addition to the audio information may be dot-coded, printed, and recorded as information regarding handling of the electronic apparatuses. In addition, only information such as video information or text data that can be handled by a computer may be arranged so as to be printed and recorded in the instruction manuals.

In the above application examples, the description has been given with reference to the dot code 1 that can be optically read out. In addition to the dot code 1, however, the present invention allows employment of various other code images that are optically readable. Also, electronic apparatuses to which the present invention can be employed are not restricted to the example reading apparatuses as described above, but the present invention may be applied to various other electronic apparatuses and devices. They include telephones, facsimile machines, video apparatuses, personal computers, and storage media containing various computer-readable software programs that allow computers including the personal computers to execute predetermined operations.

As above, while the present invention has been described referring to specific embodiments and some application examples, it is to be understood that the invention is not restricted thereto. On the contrary, the invention is intended to cover various other modifications and applications within the spirit and scope of the invention.

For example, any type of the warning sound may be employed as long as it is identifiable for one of the error causes that are the off-code, the overspeed, and the code-on-partway. Also, speech sounds may be employed to explain the individual error causes. Also, the method for expressing the causes is not limited to the sounds, and it may use light emitting diodes (LEDs) to discriminately display the individual error causes depending on the number and the patterns of blinks. Alternatively, a liquid crystal display (LCD) may be used to display the error causes in capital letters.

Regarding the a header, even a code containing information about the starting address and the ending address of the blocks allows the same function to be obtained. The header contains a description of the total number of blocks; however, the header is not limited to that indicating the total number of blocks. There are codes indicating that the block addresses are from "1" to "100" and are also codes starting the block address from a way as from "100" to "200". Even these codes can be handled.

The present invention is summarized as follows:

(1) A code-reading apparatus comprising:
reading means allowing manual scanning to optically read a code from a recording medium having data recorded as the code that is optically readable, the code comprising a plurality of blocks provided for defining a read unit of the code and arranged at least in a scanning direction, and each of the blocks comprising block-address information indicating an address of each of the blocks in the code;
block-address-information-obtaining means for obtaining the block-address information from each of the blocks read out by the reading means;
scanning-state-determining means for determining a scanning state of manual scanning performed for the code along the scanning direction according to an obtained pattern in obtaining the block-address information obtained by the block-address-information-obtaining means; and
notifying means for performing predetermined notification according to a result of determination performed by the scanning-state-determining means.

Specifically, the block-address-information-obtaining means (reconstituting section 9 in the embodiment) obtains the block-address information from each of the blocks. Subsequently, the scanning-state-determining means (reproducing section 11 in the embodiment) references the obtained pattern in obtaining the block-address information obtained by the block-address-information-obtaining means, thereby determining the scanning state of manual scanning performed for the code along the scanning direction. Then, the notifying means (reproducing section 11 in the embodiment) performs predetermined notification according to a result of determination performed by the scanning-state-determining means. Thus, the state at the code-read-out scanning is determined, and the result can be appropriately fed back to a user as notification; therefore, advantages of the code-reading apparatus that allows manual scanning can be enjoyed.

(2) A code-reading apparatus according to item (1), wherein the scanning-state-determining means comprises means for determining a scanning speed at manual scanning performed for the code along the scanning direction according to the obtained pattern in obtaining the block-address information.

Specifically, since the scanning speed of manual scanning performed for the code along the scanning direction is determined, according to the determination result, in a case where a read-out error occurs because of, for example, overspeed scanning, the case can be notified to the user.

(3) A code-reading apparatus according to item (1), wherein the scanning-state-determining means comprises means for determining scan deviation at manual scanning performed for the code along the scanning direction according to the obtained pattern in obtaining the block-address information.

Specifically, since the scan deviation (off-code) of manual scanning performed for the code along the scanning direction is determined, according to the determination result, in a case where a read-out error occurs because of, for example, scan deviation (off-code), the case can be notified to the user.

(4) A code-reading apparatus according to item (1), wherein the scanning-state-determining means comprises means for determining scan interruption at manual scanning performed for the code along the scanning direction according to the obtained pattern in obtaining the block-address information.

Specifically, since the scan interruption of manual scanning performed for the code along the scanning direction is determined, according to the determination result, in a case where a read-out error occurs because of, for example, termination of scanning before completion of the scanning, the case can be notified to the user.

(5) A code-reading apparatus according to one of items (1) to (4), wherein the obtained pattern in the block-address information is made of a combination of block-address information included in each of the blocks read out and block-address information included in each of blocks omitted at the read-out time.

Specifically, the pattern can be easily obtained since the obtained pattern in the block-address information is made of a combination of block-address information included in each of the blocks read out and block-address information included in each of blocks omitted at the read-out time.

(6) A code-reading apparatus according to item (5), wherein the block-address information included in each of the omitted blocks is obtained from the block-address information included in each of the blocks read out, preobtained information on the total number of blocks to be read out, and pre-obtained information on a block-arrangement way of blocks.

According to the above, the block-address information included in each of the omitted blocks can be accurately known. In addition, since a range of search for the block-address information can be specified, avoidable processing need not be performed.

(7) A code-reading apparatus according to item (6), wherein the notifying means is arranged so as not to perform the notification when the code is recognized to have an arrangement differing from the block-arrangement way.

That is, when the block-arrangement ways differ from each other, the notification operation is not performed. Therefore, avoidable processing can be eliminated.

(8) A code-reading apparatus according to item (1), wherein, the notifying means is arranged to perform predetermined notification according to a result of determination by the scanning-state-determining means, regardless of whether or not reproduction of data was successfully performed from the code read out.

According to the above, since real-time reproduction can be performed, effective tutorial guidance for a scanning-operation way can be provided to an operator.

(9) A code-reading apparatus according to item (1), wherein, the notifying means is arranged to perform predetermined notification according to a result of determination by the scanning-state-determining means to provide a notification regarding a cause for failure in reproduction of the data from the code read out.

According to the above, when an error actually occurs, a cause for the error can be notified to an operator.

(10) A code-reading apparatus according to item (1), wherein the scanning-state-determining means is arranged to be capable of detecting multiple types of the scanning states, and the notifying means is arranged to provide a notification of a unique mode according to each of the multiple scanning states.

That is, since a notification of a unique mode is provided according to each of the multiple scanning states, the notification is provided to allow the operator to understand a cause for an error.

(11) A code-reading apparatus according to item (1), further comprising trustworthy-level-providing means for providing a trustworthy level representing a reliability level of data included in each of the blocks for each of the blocks read out, wherein the scanning-state-determining means is arranged to determine the scanning state according to the obtained pattern in the block-address information and the trustworthy level provided by the trustworthy-level-providing means for each of the blocks.

According to the above, since trustworthy-level information is additionally used, even more accurate scanning-state determination can be performed. In addition, use of the trustworthy-level information facilitates an on-partway determination.

(12) A code-reading apparatus according to one of items (1) to (11), wherein the notifying means is arranged to perform one of sound output and optical display, thereby performing the notification.

According to the above, the operator can be informed of error so as to feel intuitively.

(13) An electronic-apparatus instruction manual for explaining a handling way for an electronic apparatus, comprising:

at least one of a text and an illustration regarding the handling way for the electronic apparatus; and information regarding the handling way for the electronic apparatus, the information being printed and recorded as code images that can be optically read out by manual scanning.

According to the above, since the information regarding the handling way for the electronic apparatus is directly printed and recorded as code images (dot codes) that can be optically read out by manual scanning, a user sees the instruction manual, and concurrently, uses a dedicated reading apparatus to read the code image in a desired position at a desired time, and can thereby obtain the information regarding the handling way for the electronic apparatus.

Accordingly, while using the instruction manual made from paper sheets, the user can obtain the information regarding the handling way for the electronic apparatus auditorily, visually, and easily. Thus, compared to conventional cases, the instruction manual is improved in usability, and the contained information regarding the handling way for the electronic apparatus can be easily understood.

(14) An electronic-apparatus instruction manual according to item (13), wherein the information regarding the handling way for the electronic apparatus includes at least sounds.

Thus, the aforementioned information regarding the handling way for the electronic apparatus includes at least sounds; therefore, the user can easily obtain audio information regarding the handling way for the electronic apparatus.

(15) An electronic-apparatus instruction manual according to item (14), wherein, with the electronic apparatus configured so as to output a predetermined sound when a user performs a predetermined operation, a sound regarding the handling way for the electronic apparatus, which is printed and recorded as the code image, is the predetermined sounds.

Thus, the aforementioned electronic apparatus is configured so as to output a predetermined sound when a user performs a predetermined operation. Also, a sound regarding the handling way for the electronic apparatus, which is printed and recorded as the code image, is the aforementioned predetermined sound.

According to the above, the user can directly hear of a predetermined sound regarding the operation from the instruction manual instead of reading text contained therein. This allows the user to further increase the knowledge correctly regarding operations described in the instruction manual.

(16) An electronic-apparatus instruction manual according to item (15), wherein the predetermined sounds are a sound of warning that is intended for the user.

Thus, the aforementioned predetermined sound is generated as a sound of warning. Therefore, prior to actually using the electronic apparatus, the user can easily and directly confirm the sound to which attention should be paid during operation. This allows the user not to be confused even when the sound of warning is outputted in actual operation.

(17) An electronic-apparatus instruction manual according to item (16), wherein multiple types of the sound of warning exist corresponding to individual types of the warning.

In a case where multiple types of the sound of warning exist corresponding to causes of warnings, it is difficult to identify each of the sounds of warning only from explanation text. However, according to the above, the user can to identify and confirm the individual sounds in advance according to the actual sounds. Therefore, the user is not confused by the sounds of warning that are outputted from the electronic apparatus in actual operation, and can take appropriate measures.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code-reading apparatus comprising:
    reading means allowing manual scanning to optically read a code from a recording medium having data recorded as said code that is optically readable, said code comprising a plurality of blocks provided for defining a read unit of said code and arranged at least in a scanning direction, and each of the blocks comprising block-address information indicating an address of each of the blocks in said code;
    block-address-information-obtaining means for obtaining said block-address information from each of the blocks read out by said reading means;
    scanning-state-determining means for determining a scanning state of manual scanning performed for said code along said scanning direction according to an obtained pattern in obtaining said block-address information obtained by said block-address-information-obtaining means; and
    notifying means for performing predetermined notification according to a result of determination performed by said scanning-state-determining means.

2. A code-reading apparatus according to claim 1, wherein said scanning-state-determining means comprises means for determining a scanning speed at manual scanning performed for said code along said scanning direction according to said obtained pattern in obtaining said block-address information.

3. A code-reading apparatus according to claim 1, wherein said scanning-state-determining means comprises means for determining scan deviation at manual scanning performed for said code along said scanning direction according to said obtained pattern in obtaining said block-address information.

4. A code-reading apparatus according to claim 1, wherein said scanning-state-determining means comprises means for determining scan interruption at manual scanning performed for said code along said scanning direction according to said obtained pattern in obtaining said block-address information.

5. A code-reading apparatus according to claim 1, wherein said obtained pattern in said block-address information is made of a combination of block-address information included in each of the blocks read out and block-address information included in each of blocks omitted at the read-out time.

6. A code-reading apparatus according to claim 5, wherein said block-address information included in each of said omitted blocks is obtained from said block-address information included in each of said blocks read out, preobtained information on the total number of blocks to be read out, and pre-obtained information on a block-arrangement way of blocks.

7. A code-reading apparatus according to claim 6, wherein said notifying means is arranged so as not to perform said notification when said code is recognized to have an arrangement differing from said block-arrangement way.

8. A code-reading apparatus according to claim 1, wherein, said notifying means is arranged to perform predetermined notification according to a result of determination by said scanning-state-determining means, regardless of whether or not reproduction of data was successfully performed from said code read out.

9. A code-reading apparatus according to claim 1, wherein, said notifying means is arranged to perform predetermined notification according to a result of determination by said scanning-state-determining means to provide a notification regarding a cause for failure in reproduction of said data from said code read out.

10. A code-reading apparatus according to claim 1, wherein
    said scanning-state-determining means is arranged to be capable of detecting multiple types of said scanning states, and
    said notifying means is arranged to provide a notification of a unique mode according to each of said multiple scanning states.

11. A code-reading apparatus according to claim 1, further comprising trustworthy-level-providing means for providing a trustworthy level representing a reliability level of data included in each of said blocks for each of said blocks read out, wherein said scanning-state-determining means is arranged to determine said scanning state according to said obtained pattern in said block-address information and said trustworthy level provided by said trustworthy-level-providing means for each of said blocks.

12. A code-reading apparatus according to claim 1, wherein said notifying means is arranged to perform one of sound output and optical display, thereby performing said notification.

* * * * *